United States Patent
Yu et al.

(10) Patent No.: US 12,512,677 B2
(45) Date of Patent: Dec. 30, 2025

(54) PHOTOVOLTAIC POWER GENERATION SYSTEM AND CONTROL METHOD THEREFOR, AND POWER CONVERTER

(71) Applicant: Sungrow Power Supply Co., Ltd., Hefei (CN)

(72) Inventors: Yanfei Yu, Hefei (CN); Xinyu Wang, Hefei (CN); Xiaoxun Li, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 0 days.

(21) Appl. No.: 18/695,771

(22) PCT Filed: May 25, 2022

(86) PCT No.: PCT/CN2022/094855
§ 371 (c)(1),
(2) Date: Mar. 26, 2024

(87) PCT Pub. No.: WO2023/045373
PCT Pub. Date: Mar. 30, 2023

(65) Prior Publication Data
US 2024/0405561 A1     Dec. 5, 2024

(30) Foreign Application Priority Data
Sep. 27, 2021   (CN) .......................... 202111134707.8

(51) Int. Cl.
*H02J 3/38*        (2006.01)
*H02S 40/32*       (2014.01)

(52) U.S. Cl.
CPC ................ *H02J 3/38* (2013.01); *H02S 40/32* (2014.12); *H02J 2300/24* (2020.01)

(58) Field of Classification Search
CPC ...... H02J 3/38; H02J 2300/22; H02J 2300/24; H02S 40/32
(Continued)

(56) References Cited

U.S. PATENT DOCUMENTS

| | | | |
|---|---|---|---|
| 2010/0308662 | A1 | 12/2010 | Schatz et al. |
| 2011/0273015 | A1 | 11/2011 | Adest et al. |

(Continued)

FOREIGN PATENT DOCUMENTS

| | | |
|---|---|---|
| CN | 104506132 A | 4/2015 |
| CN | 107453403 A | 12/2017 |

(Continued)

OTHER PUBLICATIONS

International Search Report and Written Opinion for International Application No. PCT/CN2022/094855 mailed Aug. 8, 2022.

(Continued)

*Primary Examiner* — Hal Kaplan
(74) *Attorney, Agent, or Firm* — Wolf, Greenfield & Sacks, P.C.

(57) ABSTRACT

A photovoltaic power generation system and a control method therefor, and a power converter are provided. The control method includes: obtaining MLPE state characterization information of the photovoltaic string; determining, based on the MLPE state characterization information, whether there is at least one MLPE device that fails to be in a normal output state; and if so, controlling a corresponding string current to be less than a preset threshold. Therefore, the power consumption of corresponding MLPE devices in the bypass operation state is reduced, allowing the MLPE devices to adopt a diode with a lower power capacity and a heat dissipation design with a lower heat dissipation requirement, and saving system costs.

18 Claims, 3 Drawing Sheets

(58) Field of Classification Search
USPC .......................................................... 307/78
See application file for complete search history.

(56) References Cited

U.S. PATENT DOCUMENTS

| | | |
|---|---|---|
| 2013/0307556 A1 | 11/2013 | Ledenev et al. |
| 2020/0067452 A1 | 2/2020 | Yang et al. |
| 2020/0185923 A1 | 6/2020 | Yang et al. |
| 2021/0091718 A1 | 3/2021 | Lee et al. |
| 2022/0038052 A1 | 2/2022 | Yu et al. |
| 2024/0154424 A1 | 5/2024 | Yang et al. |

FOREIGN PATENT DOCUMENTS

| | | | |
|---|---|---|---|
| CN | 107462800 | A | 12/2017 |
| CN | 107565600 | A | 1/2018 |
| CN | 108509737 | A | 9/2018 |
| CN | 108565891 | A | 9/2018 |
| CN | 109067353 | A | 12/2018 |
| CN | 111756072 | A | 10/2020 |
| CN | 109600115 | B | 12/2020 |
| CN | 113131518 | A | 7/2021 |
| CN | 113364413 | A | 9/2021 |
| CN | 113675892 | A | 11/2021 |
| JP | 2013-157457 | A | 8/2013 |
| JP | 2014-011428 | A | 1/2014 |

OTHER PUBLICATIONS

Extended European Search Report for European Application No. 22871434.1, dated Oct. 30, 2025.

PHOTOVOLTAIC POWER GENERATION SYSTEM AND CONTROL METHOD THEREFOR, AND POWER CONVERTER

This application is a national stage filing under 35 U.S.C. § 371 of International Patent Application Serial No. PCT/CN2022/094855, filed May 25, 2022, which claims priority to Chinese Patent Application No. 202111134707.8, titled "PHOTOVOLTAIC POWER GENERATION SYSTEM AND CONTROL METHOD THEREFOR, AND POWER CONVERTER", filed on Sep. 27, 2021 with the China National Intellectual Property Administration. The contents of these applications are incorporated herein by reference in their entirety.

FIELD

The present disclosure relates to the technical field of power electronics, and in particular to a photovoltaic power generation system and a control method therefor, and a power converter.

BACKGROUND

In a conventional photovoltaic power generation system with multiple MLPE (Module Level Power Electronics) devices, an input terminal of each MLPE device is connected to a corresponding photovoltaic module, and output terminals of the multiple MLPE devices are sequentially connected to in series to form a photovoltaic string.

For an MLPE device, such as a component shutdown device or a power optimizer, a power semiconductor device, which is used to control electrical energy flowing through said MLPE device in a normal output state, is provided in said MLPE device, and a bypass diode, which is used to bypass a photovoltaic module connected to said MLPE device from a corresponding photovoltaic string and to provide a flow path for said photovoltaic string in a bypass operation state, is further provided in said MLPE device.

Due to the significantly greater conduction voltage drop of the bypass diode compared to the conduction voltage drop of the power semiconductor device, the MLPE device has significantly greater losses and heating during the bypass operation state compared to the normal output state. Hence, it is usually necessary to choose a diode with a larger power capacity as the bypass diode for the MLPE device, and the heat dissipation of the MLPE device should also be designed based on the heating situation during the bypass operation state. Therefore, the system cost is high.

SUMMARY

A photovoltaic power generation system and a control method therefor, and a power converter are provided in the present disclosure, to decrease a power consumption of an MLPE device in a bypass operation state, thereby saving a system cost by choosing a diode with a lower power capacity and a heat dissipation design with a lower heat dissipation requirement.

To achieve the above objectives, the present disclosure provides the following technical solutions.

In a first aspect, a control method for a photovoltaic power generation system is provided in the present disclosure. The power generation system includes: at least one photovoltaic string and a power converter connected to an output terminal of the at least one photovoltaic string. The photovoltaic string includes at least two module level power electronic, MLPE, devices. Output terminals of the at least two MLPE devices are connected in series, and an input terminal of each MLPE device is connected to at least a corresponding photovoltaic module. The control method includes:

obtaining MLPE state characterization information of the at least one photovoltaic string;

determining, based on the MLPE state characterization information, whether there is at least one MLPE device in the at least one photovoltaic string that fails to be in a normal output state; and controlling, in a case that there is at least one MLPE device in the at least one photovoltaic string that fails to be in the normal output state, a corresponding string current to be less than a preset threshold.

Optionally, the obtaining MLPE state characterization information of the at least one photovoltaic string includes:

obtaining, by means of communication, operation data of each MLPE device in the at least one photovoltaic string respectively as the MLPE state characterization information.

Optionally, the determining whether there is at least one MLPE device in the at least one photovoltaic string that fails to be in a normal output state includes:

determining whether there is at least one MLPE device in the at least one photovoltaic string that is in a bypass operation state; and determining, in a case that there is at least one MLPE device in the at least one photovoltaic string that is in the bypass operation state, that a corresponding MLPE device fails to be in the normal output state.

Optionally, the determining whether there is at least one MLPE device in the at least one photovoltaic string that fails to be in a normal output state includes:

determining whether there is at least one MLPE device in the at least one photovoltaic string that is in a faulty state; and determining, in a case that there is at least one MLPE device in the at least one photovoltaic string that is in the faulty state, that a corresponding MLPE device fails to be in the normal output state.

Optionally, the determining whether there is at least one MLPE device in the at least one photovoltaic string that fails to be in a normal output state includes:

determining whether there is at least one MLPE device in the at least one photovoltaic string that is in an over-temperature state; and determining, in a case that there is at least one MLPE device in the at least one photovoltaic string that is in the over-temperature state, that a corresponding MLPE device fails to be in the normal output state.

Optionally, after the obtaining operation data of each MLPE device in the at least one photovoltaic string respectively, in a case that there is at least one MLPE device that fails to obtain temperature data of corresponding operation data, the control method further includes:

for an MLPE device that fails to obtain temperature data, calculating temperature data of other MLPE devices within a preset distance of said MLPE device to obtain the temperature data of the corresponding operation data.

Optionally, the determining whether there is at least one MLPE device in the at least one photovoltaic string that fails to be in a normal output state includes:

determining whether there is at least one MLPE device in the at least one photovoltaic string that is in a communication-loss state; and determining, in a case that there is at least one MLPE device in the at least one photovoltaic string that is in the communication-loss state, that a corresponding MLPE device fails to be in the normal output state.

Optionally, the obtaining MLPE state characterization information of the at least one photovoltaic string includes:

obtaining, by means of detecting, an operation parameter of the at least one photovoltaic string as the MLPE state characterization information.

Optionally, the operation parameter includes: at least one of voltage, current and power.

Optionally, before the obtaining MLPE state characterization information of the at least one photovoltaic string, the control method further includes:

changing an operation state of the at least one photovoltaic string;

where the determining whether there is at least one MLPE device in the at least one photovoltaic string that fails to be in a normal output state includes:

determining whether a variation of the operation parameter of the at least one photovoltaic string before changing the operation state and after changing the operation state exceeds a preset variation; and determining, in a case that the variation of the operation parameter of the at least one photovoltaic string exceeds the preset variation, that there is at least one MLPE device in the at least one photovoltaic string that fails to be in the normal output state.

Optionally, when the number of the at least one photovoltaic string is greater than one, the determining whether there is at least one MLPE device in the at least one photovoltaic string that fails to be in a normal output state includes:

determining whether a difference in a same operation parameter corresponding to the at least one photovoltaic strings is greater than a corresponding preset difference; and determining, in a case that the difference in the same operation parameter corresponding to the at least one photovoltaic strings is greater than the corresponding preset difference, that there is at least one MLPE device in the at least one photovoltaic string that fails to be in the normal output state.

Optionally, the controlling a corresponding string current to be less than a preset threshold includes:

controlling, by an action of the power converter, the corresponding string current to be less than the preset threshold.

Optionally, the action of the power converter includes:

disturbing an operation voltage or current of said photovoltaic string.

Optionally, the controlling a corresponding string current to be less than a preset threshold includes:

controlling, by changing an operation state of a corresponding MLPE device in the at least one photovoltaic string, the corresponding string current to be less than the preset threshold.

Optionally, a method for changing the operation state of the corresponding MLPE device in the at least one photovoltaic string includes any one of the following:

turning on, turning off, performing power reduction, cancelling power reduction, increasing an output current and reducing the output current.

In a second aspect, a power converter is provided in the present disclosure. The power converter includes a main circuit and a control unit. An input terminal of the main circuit is connected to at least one photovoltaic string. The photovoltaic string includes at least two module level power electronic, MLPE, devices. Output terminals of the at least two MLPE devices are connected in series, and an input terminal of each MLPE device is connected to a corresponding photovoltaic module. The main circuit is controlled by the control unit, and the control unit is further configured to perform the control method for the photovoltaic power generation system according to any one of embodiments of the first aspect.

Optionally, the main circuit includes: a DC/AC conversion circuit; or a DC/DC conversion circuit; or a DC/AC conversion circuit and at least one DC/DC conversion circuit connected to an input terminal of the DC/AC conversion circuit.

In a third aspect, a photovoltaic power generation system is provided in the present disclosure. The photovoltaic power generation system includes: the power converter according to any one of embodiments of the second aspect; and at least one photovoltaic string connected to an input terminal of the power converter. The photovoltaic string includes at least two module level power electronic, MLPE, devices. Output terminals of the at least two MLPE devices are connected in series, and an input terminal of each MLPE device is connected to at least a corresponding photovoltaic module.

In the control method of the photovoltaic power generation system provided in the present disclosure, MLPE state characterization information of the at least one photovoltaic string is obtained first. Then, whether there is at least one MLPE device in the at least one photovoltaic string that fails to be in a normal output state is determined based on the MLPE state characterization information. In a case that there is at least one MLPE device in the at least one photovoltaic string that fails to be in the normal output state, a current of a corresponding photovoltaic string is controlled to be less than a preset threshold. Therefore, the power consumption of corresponding MLPE devices in the bypass operation state is reduced, allowing the MLPE devices to adopt a diode with a lower power capacity and a heat dissipation design with a lower heat dissipation requirement, and saving system costs.

BRIEF DESCRIPTION OF THE DRAWINGS

For more clearly illustrating embodiments of the present disclosure or the technical solution in the conventional technology, drawings referred to describe the embodiments or the conventional technology will be briefly described hereinafter. Apparently, the drawings in the following description show only several embodiments of the present disclosure. And for those skilled in the art, other drawings may be obtained based on these drawings without any creative efforts.

DETAILED DESCRIPTION

Technical solutions in the embodiments of the present disclosure are clearly and completely described below in conjunction with the drawings of the embodiments of the present disclosure. Apparently, the embodiments described in the following are only some embodiments of the present disclosure, rather than all of the embodiments. Any other embodiments acquired by those skilled in the art based on the embodiments in the present disclosure without any creative efforts fall within the protection scope of the present disclosure.

In the present disclosure, terms "include", "comprise" or any other variants are intended to be non-exclusive. Therefore, a process, method, article or device including a series of elements includes not only the elements but also other elements that are not enumerated, or also include elements inherent for the process, method, article or device. Unless expressively limited otherwise, a process, method, article or device limited by "comprising/including a (n) . . ." does not exclude existence of another identical element in such process, method, article or device.

In practical applications, an MLPE device may be a component shutdown device, a power optimizer and so on.

Figure 1:
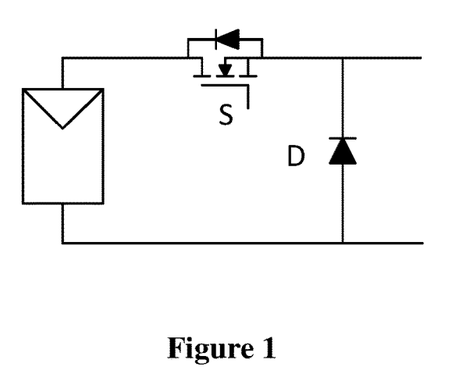
FIG. 1 is a schematic structure diagram of a component shutdown device according to conventional technology.

FIG. 1 shows a commonly used structure of the component shutdown device. When the component shutdown device is in a conduction state, namely a normal output state, a power semiconductor device S is turned on, a bypass diode D is cut off, and a photovoltaic module outputs electrical energy to the outside. When the component shutdown device is in an off state, namely a bypass operation state, the power semiconductor device S is turned off, the photovoltaic module at an input terminal no longer outputs electrical energy to the outside, and a string current flows through the bypass diode D and forms a path. A conduction voltage drop of the bypass diode D is significantly higher than a conduction voltage drop of the power semiconductor S, which leads to a consequence that the loss and heat generation of the component shutdown device in the off state is much higher than that in the conduction state. Therefore, a diode with a lager power capacity should be chosen for the bypass diode D of the component shutdown device, and the heat dissipation of the component shutdown device should be designed according to a condition of the heat dissipation in the off state.

Figure 2A:
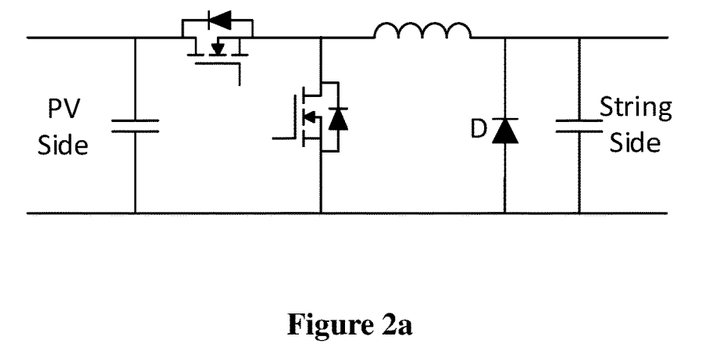
FIG. 2a and FIG. 2b are two schematic structure diagrams of a power optimizer according to conventional technology.
Figure 2B:
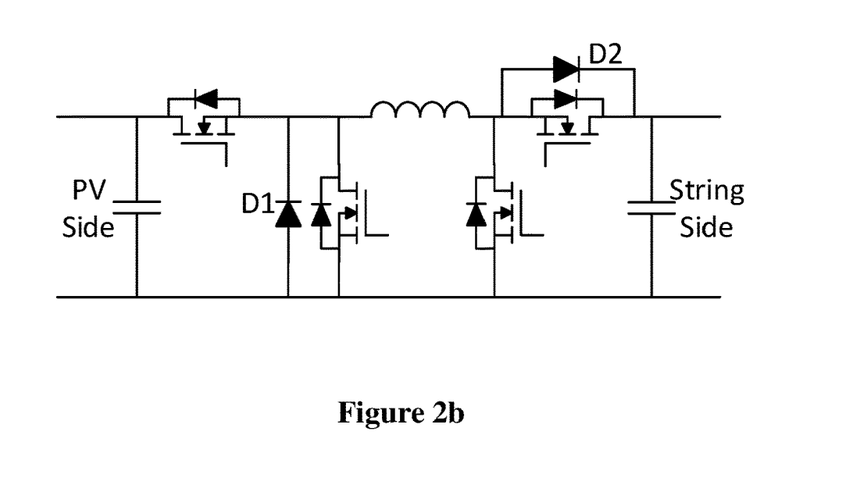

The power optimizer adopts a high-frequency switch transistor to perform MPPT (Maximum Power Point Tracking) and output a maximum power of the photovoltaic module. If the MPPT function of a single power optimizer fails, a current of the photovoltaic string will pass through the bypass diode at an output terminal (the String Side as showed in FIG. 2a and FIG. 2b) of the power optimizer to form a path. For example, the power optimizer may lose power due to the disconnection between the input terminal (the PV Side as showed in FIG. 2a and FIG. 2b) and the photovoltaic module, or the internal control circuit may be damaged, resulting in the failure of the MPPT function. For example, for a Buck type optimizer as showed in FIG. 2a, after the MPPT function fails, the bypass diode will provide a current path for the photovoltaic string. In a same way, for a BuckBoost type optimizer as showed in FIG. 2b, after the MPPT function fails, the bypass diodes D1 and D2 will provide a current path for the photovoltaic string. Therefore, the power optimizer will enter the bypass operation state when the MPPT function fails, generating more heating than in the MPPT operation state. Thus, a diode with a larger power capacity should be chosen and the heat dissipation ability of the device should be designed according to the heat generation condition of the diode in the bypass operation state.

A control method of a photovoltaic power generation system is provided in the present disclosure, to decrease the power consumption of the MLPE device in the bypass operation state, thereby saving the system cost by choosing a diode with a lower power capacity and a heat dissipation design with a lower heat dissipation requirement.

Figure 3:
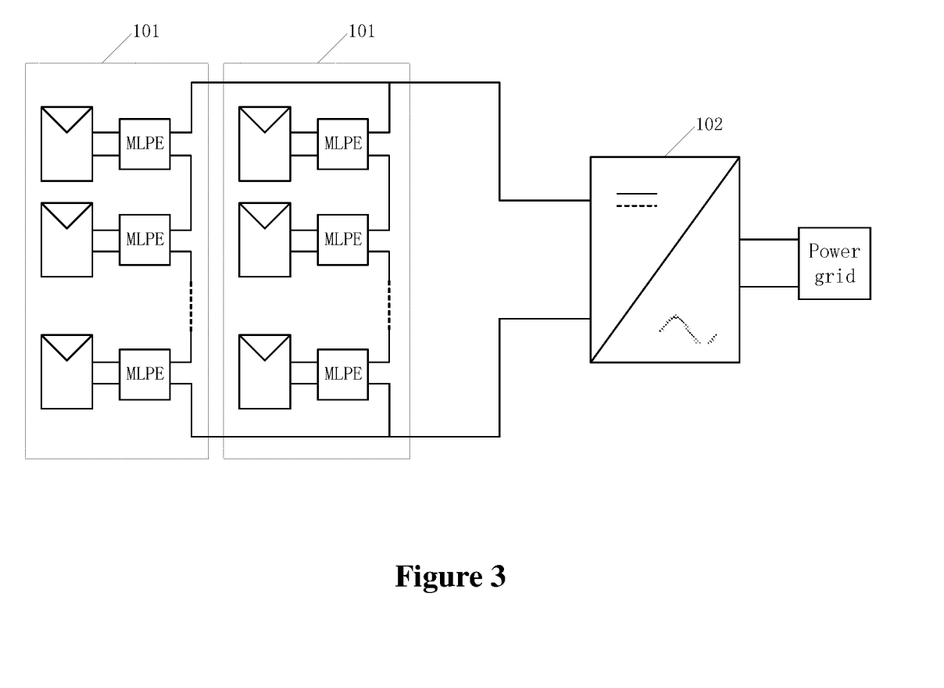
FIG. 3 is a schematic structure diagram of a photovoltaic power generation system according to an embodiment of the present disclosure.

As shown in FIG. 3, the photovoltaic power generation system includes: at least a photovoltaic string 101 (as shown in FIG. 3 with two as an example) and a power converter 102 at a rear stage of the photovoltaic string 101. That is, the power converter 102 belongs to a string level power converter.

The photovoltaic string 101 includes at least two MLPE devices, output terminals of the at least two MLPE devices are connected in series, and an input terminal of each MLPE device is connected to a corresponding photovoltaic module. In practical applications, each MLPE device may connect to a photovoltaic module separately (as shown in FIG. 3) and also may connect to two or more photovoltaic modules, depending on the specific application environment.

Each MLPE device in the photovoltaic string 101 may be the power optimizer that performs the power adjustment function or may be the component shutdown device that performs the shutdown function. Alternatively, the MLPE devices may be a mixed installation of the power optimizer and the component shutdown device, which is not limited herein and is within the protection scope of the present disclosure.

An apparatus to perform the control method may be a control unit of the power converter 102, a system controller of the photovoltaic power generation system, or an extra controller, depending on the specific application environment, which is within the protection scope of the present disclosure. The following will take the control unit in power converter 102 as an example for explanation.

Figure 4:
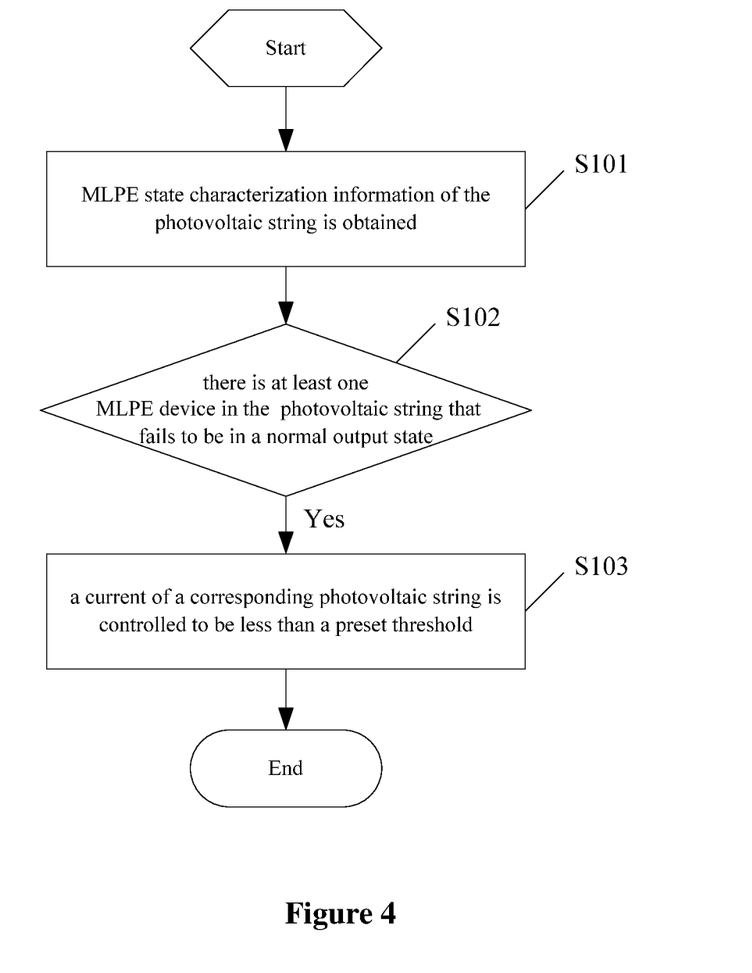
FIG. 4 is a flow diagram of a control method of a photovoltaic power generation system according to an embodiment of the present disclosure.

Referring to FIG. 4, the control method includes steps S101 to S103.

In step S101, MLPE state characterization information of the photovoltaic string is obtained.

The MLPE state characterization information is information that can characterize the state of the MLPE device in the photovoltaic string. Specifically, the MLPE state characterization information may be the operation data of each MLPE device obtained by the control unit of the power converter by means of communication, which can directly characterize the state of each MLPE device. Alternatively, the MLPE state characterization information may also be the operation parameters of the photovoltaic string detected by the control unit, which can characterize the output state of the photovoltaic string and reflect whether at least one MLPE device has experienced a state change. The specific selection of the MLPE state characterization information may depend on its specific application environment, which is within the scope of protection of this application.

In practical applications, the step S101 may be performed in real time or periodically, which depends on the specific application environment.

In step S102, whether there is at least one MLPE device in the at least one photovoltaic string that fails to be in a normal output state is determined based on the MLPE state characterization information.

In the normal output state, the corresponding photovoltaic module outputs electrical energy through the MLPE device, and the conduction voltage drop of the power semiconductor device inside the MLPE device is relatively small, so the power consumption and temperature of the MLPE device are within a normal range.

When at least one MLPE device is not in the normal output state, such as in the bypass operation state, the MLPE device will flow the string current through its internal bypass diode. Due to the relatively high conduction voltage drop of the bypass diode, at this time, if the cost is not sacrificed and the selection specifications and heat dissipation specifications of the bypass diode are not improved, that is, it is allowed to work according to the traditional solution, the power consumption and/or temperature of the MLPE device will exceed the corresponding normal range, which will easily lead to device damage or a safety accident. Therefore step S103 needs to be performed.

In step S103, a current of a corresponding photovoltaic string is controlled to be less than a preset threshold.

After identifying that at least one MLPE device is not in the normal output state, the control unit controls the current of the corresponding photovoltaic string to not exceed the preset threshold, thereby reducing the heating power of the MLPE device and ensuring that the entire system operates reliably. For example, under normal conditions, a maximum current of the photovoltaic string is 15 A. After identifying that that at least one MLPE device is not in the normal output state, the control unit can control the current of the corresponding photovoltaic string to not exceed 11 A.

In the control method according to the embodiment of the present disclosure, the power consumption of the corresponding MLPE device in the bypass operation state is reduced based on the above principles, so that the bypass diode with smaller power capacity and heat dissipation measures with lower heat dissipation requirement could be adopted in the design of the MLPE device, avoiding the problem of sacrificing cost in exchange for reliable operation of the system in conventional technology.

On the basis of the previous embodiment, in this embodiment, a detailed explanation of the control method is provided by taking a communication mechanism between the control unit and various MLPE devices, which means that the control units can communicate with each other as an example.

Specifically, the communication between the control unit and various MLPE devices can be PLC (Power Line Carrier Communication) communication, ZigBee communication, etc., which is not limited here, depends on the application environment, and is within the protection scope of this application.

The step S101 may specifically include: obtaining, by means of communication, operation data of each MLPE device in the at least one photovoltaic string respectively as the MLPE state characterization information.

There may be various implementation forms for the step S102 of determining whether there is at least one MLPE device in the at least one photovoltaic string that fails to be in the normal output state as follows.

1) The operation data can reflect the state of the corresponding MLPE device, such as the normal output state or the bypass operation state.

The step S102 may specifically include: determining whether there is at least one MLPE device in the at least one photovoltaic string that is in the bypass operation state.

If there is at least one MLPE device in the photovoltaic string that is in the bypass operation state, it is determined that it is not in the normal output state, and the step S103 is performed, thereby reducing the power consumption of the MLPE device in the bypass operation state, so that the MLPE device can adopt the bypass diode with smaller power capacity and the heat dissipation measures with lower heat dissipation requirement.

2) Through the operation data, the identifiable state of the MLPE device also includes a faulty state, which includes but not limited to overcurrent, overvoltage, single device failure, wiring error, etc. Specifically, the step S102 further includes: determining whether there is at least one MLPE device in the at least one photovoltaic string that is in the faulty state.

If there is at least one MLPE device in the photovoltaic string that is in the faulty state, it is determined that it is not in a normal output state, and the step S103 is performed, so as to avoid the MLPE device from the expanding the fault due to the large current.

3) The operation data includes temperature data of the MLPE device. Through the operation data, the identifiable state of the MLPE device also includes an over-temperature state. Specifically, the step S102 further includes: determining whether there is at least one MLPE device in the at least one photovoltaic string that is in the over-temperature state.

If there is at least one MLPE device in the photovoltaic string that is in the over-temperature state, it is determined that it is not in a normal output state, and the step S103 is performed, thereby reducing the power consumption of the MLPE device in the bypass operation state, avoiding further deterioration of the over-temperature, and ensuring that the MLPE device can adopt the bypass diode with smaller power capacity and the heat dissipation measures with lower heat dissipation requirement.

In particular, if a certain MLPE device does not have a corresponding temperature detection device, or its temperature detection device has a device failure, transmission failure, etc., that is, after the step S101 and after obtaining the operation data of each MLPE device in the photovoltaic string respectively, if there is at least one MLPE device that fails to obtain the temperature data of the corresponding operation data, the control method further includes: for an MLPE device that fails to obtain temperature data, calculating temperature data of other MLPE devices within a preset distance of said MLPE device to obtain the temperature data of the corresponding operation data. For example, the temperature data from several nearby MLPE devices is selected and weighted averaged, and the temperature of the target MLPE device is calculated.

4) Through the operation data, the identifiable state of the MLPE device also includes a communication-loss state. The communication loss of the MLPE device is likely caused by damage or abnormality of the MLPE device, such as damage to the power circuit, disconnection with the photovoltaic module at the input terminal, etc. In this case, the MLPE device may operate in the bypass operation state. Specifically, the step S102 further includes: judging whether at least one MLPE device in the photovoltaic string is in the communication-loss state.

If there is at least one MLPE device in the photovoltaic string that is in the communication-loss state, it is determined that it is not in the normal output state, and the step S103 is performed, thereby reducing the power consumption of the MLPE device in bypass operation state and preventing the target MLPE device from possible overheating and fault expansion in the bypass operation state.

In addition to obtaining the operation data of the MLPE device by means of communication, the control unit can also obtain the operation parameters of the photovoltaic string by means of detection, as the MLPE state characterization information, to implement step S101. This situation is applicable to scenarios without a communication system, or the scenario where the control unit can only send instructions to the MLPE device in one direction.

The operation parameters include: at least one of voltage, current and power, which depends on the specific application environment and is within the protection scope of the present disclosure.

Specifically, the step S102 may specifically include: detecting whether an open circuit voltage of the photovoltaic string is significantly lower than a prestored open circuit voltage value, if so, determining that at least one MLPE device is in a fault or abnormal state, and then performing the step S103. Alternatively, the step S102 may also include: detecting whether the current of the photovoltaic string exceeds a preset current value, and if so, performing the step S103 to prevent overheating of the MLPE device. In addition, in practical applications, different preset current values can also be set at different temperatures. In general, the configuration for MLPE device will enable it to withstand higher current at low temperatures, even if the temperature rise is higher, it will not reach the dangerous over-temperature values. Therefore, a higher preset current value can be set at lower temperatures, while a lower preset current value can be set at higher temperatures, to fully utilize the power generation performance of the MLPE device and the photovoltaic strings. Moreover, the temperature involved here can be collected by using a temperature sensor set by the power converter itself. Of course, it cannot be ruled out that it is the temperature collected by the MLPE device, which depends on the specific application environment and is within the protection scope of this application.

As a preferred method, before the step S101, the following step is performed: changing the operation state of the photovoltaic string. In this case, the step S102 includes: determining whether a variation of the operation parameter of the at least one photovoltaic string before changing the operation state and after changing the operation state exceeds a preset variation; and determining, in a case that the variation of the operation parameter of the at least one photovoltaic string exceeds the preset variation, that there is at least one MLPE device in the at least one photovoltaic string that fails to be in the normal output state.

That is, the control unit controls the photovoltaic string to be in a certain state, and then detects the operation parameters of the photovoltaic string at this time to determine whether there is at least one MLPE device that is not in the normal output state. For example, the control unit first issues instructions to control all MLPE device photovoltaic strings to stop external output, and then detects the voltage of the photovoltaic strings. If the voltage of the photovoltaic strings is found to be significantly high, it is determined that at least one MLPE device is in the fault or abnormal state.

As a preferred method, when the quantity of photovoltaic strings connected to the front stage of the power converter is greater than one, the step S102 includes: determining whether a difference between a same operation parameter of the at least one photovoltaic strings is greater than a corresponding preset difference; and determining, in a case that the difference between the same operation parameter of the at least one photovoltaic strings is greater than the corresponding preset difference, that there is at least one MLPE device in the at least one photovoltaic string that fails to be in the normal output state.

For example, if the front stage of the power converter is connected to two photovoltaic strings, the initial open-circuit voltage of the two photovoltaic strings is 800V, and the open-circuit voltage of one photovoltaic string suddenly drops to 750V, then it is determined that there may be one MLPE device in the abnormal state.

It should be noted that, on the basis of the above-mentioned embodiments, in practical applications, the power converter may be a single-stage inverter implemented by a DC/AC conversion circuit. Alternatively, the power converter may be a two-stage inverter composed of the DC/AC conversion circuit and at least one DC/DC conversion circuit at a front stage of the DC/AC conversion circuit, where only one integrated control unit is configured within the two-stage inverter to achieve control over each stage of the conversion circuits. In addition, the power converter may also be a separate DC/DC converter. For example, a Boost converter at the front stage of the photovoltaic inverter, or a Boost converter with an independent control unit inside the two-stage inverter.

Regardless of the specific structure of the power converter, the power converter has at least one power conversion unit, which is the DC/DC converter and/or the DC/AC converter. The control unit can control the power conversion unit to change the current of the photovoltaic string. That is, the step S103 may be implemented by the power converter itself, and the step S103 specifically includes: controlling, by an action of the power converter, the corresponding string current to be less than the preset threshold. The action of the power converter includes: disturbing an operation voltage or current of said photovoltaic string, thereby changing the current of the photovoltaic string to be less than the preset threshold.

In addition, the step S103 may also include: controlling, by changing an operation state of a corresponding MLPE device in the at least one photovoltaic string, the corresponding string current to be less than the preset threshold. That is, the control unit can change the operation state of the MLPE device by sending instructions to the MLPE device, so as to change the current of the photovoltaic string at the input terminal.

Specifically, a method for changing the operation state of the corresponding MLPE device in the at least one photovoltaic string comprises any one of the following: turning on, turning off, performing power reduction, cancelling power reduction, increasing an output current, and reducing the output current.

As a preferred method, the control unit can issue instructions to enable and disable an MLPE device to at least one MLPE device, so that the photovoltaic module at the input terminal can be connected to the photovoltaic string or disconnected from the photovoltaic string, thereby achieving the effect of changing the current of the photovoltaic string.

As a preferred method, if the MLPE device is a power optimizer that can perform power regulation, the control unit can issue instructions to perform and cancel power reduction to at least one MLPE device, to adjust the output power, thereby achieving the effect of changing the current of the photovoltaic string.

As a preferred method, if the MLPE device is a power optimizer that can adjust the output current, the control unit can issue a current regulation instruction, such as instructions to increase or decrease the output current, to at least one MLPE device to adjust output current, thereby achieving the effect of changing the current of the photovoltaic string.

According to another embodiment of the present disclosure, a power converter is provided, and the power converter includes a main circuit and a control unit.

The main circuit may only include a DC/AC conversion circuit, or may only include a DC/DC conversion circuit, or may also include the DC/AC conversion circuit and at least one DC/DC conversion circuit at a front stage of the DC/AC conversion circuit.

An input terminal of the main circuit is connected to at least one photovoltaic string. The photovoltaic string includes at least two MLPE devices, output terminals of the at least two MLPE devices are connected in series, and an input terminal of each MLPE device is connected to a corresponding photovoltaic module.

The main circuit is controlled by the control unit. Moreover, the control unit is also used to perform the control method described in any of the above-mentioned embodiments. The specific process and principle of the control method can refer to the above-mentioned embodiment, which will not be repeated here one by one.

According to another embodiment of the present disclosure, a photovoltaic power generation system is further provided. As shown in FIG. 3, the photovoltaic power generation system includes a power converter 102 and at least one photovoltaic string 101 at a front stage of the power converter 102.

The photovoltaic string includes at least two MLPE devices, output terminals of the at least two MLPE devices are connected in series, and an input terminal of each MLPE device is connected to a corresponding photovoltaic module.

The structure and working principle of the power converter 102 can be referred to the above-mentioned embodiments, which will not be repeated here one by one.

When there is only one stage of DC/AC conversion circuit in the power converter, the DC side of the DC/AC conversion circuit is used as the input terminal, connected to a photovoltaic string, or at least two parallel connected photovoltaic strings. When a DC/DC conversion circuit is included in the power converter, the input terminals of each DC/DC conversion circuit are connected to a photovoltaic string respectively, or are connected to at least two parallel connected photovoltaic strings respectively. This depends on the specific application environment.

The power converter 102 can specifically be an inverter. Through the working principles described in the above-mentioned embodiments, this photovoltaic power generation system is linked with the MLPE device through the inverter, avoiding the scenario where the MLPE device bypasses a large current, and ensuring the cost of the MLPE device lower compared with the conventional technology, which is favorable for popularization and application.

The embodiments in the description are described in a progressive manner, the same and similar parts between embodiments may be referred to each other, and each embodiment focuses on the differences from other embodiments. In particular, for the system or the system embodiment, since it is basically similar to the method embodiment, the description is relatively simple, and for relevant parts, please refer to the part of the description of the method embodiment. The systems and system embodiments described above are only illustrative, and the units described as separate components may or may not be physically separated, and the components shown as units may or may not be physical units, that is it can be located in one place, or it can be distributed to multiple network elements. Part or all of the modules can be selected according to actual needs to achieve the purpose of the scheme of this embodiment. It can be understood and implemented by those skilled in the art without creative effort.

Professionals can further realize that the units and algorithm steps of the examples described in conjunction with the embodiments disclosed herein can be implemented by electronic hardware, computer software or a combination of the two. In order to clearly illustrate the possible for interchangeability between hardware and software, in the above description, the composition and steps of each example have been generally described according to their functions. Whether these functions are executed by hardware or software depends on the specific application and design constraints of the technical scheme. Skilled artisans may use different methods to implement the described functions for each specific application, but such implementation should not be regarded as exceeding the scope of the present disclosure.

For the above description of the disclosed embodiments, the features recorded in each embodiment in this specification can be replaced or combined with each other, so that those skilled in the art can realize or use the present invention. Various modifications to these embodiments will be readily apparent to those skilled in the art, and the general principles defined herein may be implemented in other embodiments without departing from the spirit or scope of the invention. Therefore, the present invention will not be limited to the embodiments shown herein, but is to be accorded the widest scope consistent with the principles and novel features disclosed herein.

The invention claimed is:

1. A control method for a photovoltaic power generation system, wherein the photovoltaic power generation system comprises: at least one photovoltaic string and a power converter connected to an output terminal of the at least one photovoltaic string, the photovoltaic string comprises at least two module level power electronic, MLPE, devices, output terminals of the at least two MLPE devices are connected in series, and an input terminal of each MLPE device is connected to at least a corresponding photovoltaic module;

wherein the control method comprises:
obtaining MLPE state characterization information of the at least one photovoltaic string;
determining, based on the MLPE state characterization information, whether there is at least one MLPE device in the at least one photovoltaic string that fails to be in a normal output state; and
controlling, in a case that there is at least one MLPE device in the at least one photovoltaic string that fails to be in the normal output state, a corresponding string current to be less than a preset threshold.

2. The control method according to claim 1, wherein the obtaining MLPE state characterization information of the at least one photovoltaic string comprises:
obtaining, by means of communication, operation data of each MLPE device in the at least one photovoltaic string respectively as the MLPE state characterization information.

3. The control method according to claim 2, wherein the determining whether there is at least one MLPE device in the at least one photovoltaic string that fails to be in a normal output state comprises:
determining whether there is at least one MLPE device in the at least one photovoltaic string that is in a bypass operation state; and
determining, in a case that there is at least one MLPE device in the at least one photovoltaic string that is in the bypass operation state, that a corresponding MLPE device fails to be in the normal output state.

4. The control method according to claim 2, wherein the determining whether there is at least one MLPE device in the at least one photovoltaic string that fails to be in a normal output state comprises:
   determining whether there is at least one MLPE device in the at least one photovoltaic string that is in a faulty state; and
   determining, in a case that there is at least one MLPE device in the at least one photovoltaic string that is in the faulty state, that a corresponding MLPE device fails to be in the normal output state.

5. The control method according to claim 2, wherein the determining whether there is at least one MLPE device in the at least one photovoltaic string that fails to be in a normal output state comprises:
   determining whether there is at least one MLPE device in the at least one photovoltaic string that is in an over-temperature state; and
   determining, in a case that there is at least one MLPE device in the at least one photovoltaic string that is in the over-temperature state, that a corresponding MLPE device fails to be in the normal output state.

6. The control method according to claim 5, wherein after the obtaining operation data of each MLPE device in the at least one photovoltaic string respectively, in a case that there is at least one MLPE device that fails to obtain temperature data of corresponding operation data, the control method further comprises:
   for an MLPE device that fails to obtain temperature data, calculating temperature data of other MLPE devices within a preset distance of said MLPE device to obtain the temperature data of the corresponding operation data.

7. The control method according to claim 2, wherein the determining whether there is at least one MLPE device in the at least one photovoltaic string that fails to be in a normal output state comprises:
   determining whether there is at least one MLPE device in the at least one photovoltaic string that is in a communication-loss state; and
   determining, in a case that there is at least one MLPE device in the at least one photovoltaic string that is in the communication-loss state, that a corresponding MLPE device fails to be in the normal output state.

8. The control method according to claim 1, wherein the obtaining MLPE state characterization information of the at least one photovoltaic string comprises:
   obtaining, by means of detecting, an operation parameter of the at least one photovoltaic string as the MLPE state characterization information.

9. The control method according to claim 8, wherein the operation parameter comprises: at least one of voltage, current and power.

10. The control method according to claim 9, wherein before the obtaining MLPE state characterization information of the at least one photovoltaic string, the control method further comprises:
    changing an operation state of the at least one photovoltaic string;
    wherein the determining whether there is at least one MLPE device in the at least one photovoltaic string that fails to be in a normal output state comprises:
    determining whether a variation of the operation parameter of the at least one photovoltaic string before changing the operation state and after changing the operation state exceeds a preset variation; and
    determining, in a case that the variation of the operation parameter of the at least one photovoltaic string exceeds the preset variation, that there is at least one MLPE device in the at least one photovoltaic string that fails to be in the normal output state.

11. The control method according to claim 9, wherein when the number of the at least one photovoltaic string is greater than one, the determining whether there is at least one MLPE device in the at least one photovoltaic string that fails to be in a normal output state comprises:
    determining whether a difference in a same operation parameter corresponding to the at least one photovoltaic strings is greater than a corresponding preset difference; and
    determining, in a case that the difference in the same operation parameter corresponding to the at least one photovoltaic strings is greater than the corresponding preset difference, that there is at least one MLPE device in the at least one photovoltaic string that fails to be in the normal output state.

12. The control method according to claim 1, wherein the controlling a corresponding string current to be less than a preset threshold comprises:
    controlling, by an action of the power converter, the corresponding string current to be less than the preset threshold.

13. The control method according to claim 12, wherein the action of the power converter comprise:
    disturbing an operation voltage or current of said photovoltaic string.

14. The control method according to claim 1, wherein the controlling a corresponding string current to be less than a preset threshold comprises:
    controlling, by changing an operation state of a corresponding MLPE device in the at least one photovoltaic string, the corresponding string current to be less than the preset threshold.

15. The control method according to claim 14, wherein a method for changing the operation state of the corresponding MLPE device in the at least one photovoltaic string comprises any one of the following:
    turning on, turning off, performing power reduction, cancelling power reduction, increasing an output current and reducing the output current.

16. A power converter, comprising:
    a main circuit; and
    a control unit;
    wherein an input terminal of the main circuit is connected to at least one photovoltaic string, the photovoltaic string comprises at least two module level power electronic, MLPE, devices, output terminals of the at least two MLPE devices are connected in series, and an input terminal of each MLPE device is connected to at least a corresponding photovoltaic module; and
    wherein the main circuit is controlled by the control unit, and the control unit is further configured to perform the control method for the photovoltaic power generation system according to claim 1.

17. The power converter according to claim 16, wherein the main circuit comprises:
    a DC/AC conversion circuit; or
    a DC/DC conversion circuit; or
    a DC/AC conversion circuit and at least one DC/DC conversion circuit connected to an input terminal of the DC/AC conversion circuit.

18. A photovoltaic power generation system comprising:
    the power converter according to claim 16; and at least one photovoltaic string connected to an input terminal of the power converter;

wherein the photovoltaic string comprises at least two module level power electronic, MLPE, devices, output terminals of the at least two MLPE devices are connected in series, and an input terminal of each MLPE device is connected to a corresponding photovoltaic module.

\* \* \* \* \*